United States Patent
Detry (10) Patent No.: US 8,121,487 B2
(45) Date of Patent: Feb. 21, 2012

(54) SYSTEM AND METHOD FOR FREE SPACE MICRO MACHINED OPTICAL BENCH

(75) Inventor: James F. Detry, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 998 days.

(21) Appl. No.: 12/026,458

(22) Filed: Feb. 5, 2008

(65) Prior Publication Data

US 2009/0196623 A1  Aug. 6, 2009

(51) Int. Cl.
*H04B 10/00* (2006.01)
(52) U.S. Cl. .......... 398/124; 398/141; 398/142
(58) Field of Classification Search .......... 398/124, 398/130, 141–142, 168–172
See application file for complete search history.

(56) References Cited

U.S. PATENT DOCUMENTS

| | | | |
|---|---|---|---|
| 5,263,111 A | 11/1993 | Nurse et al. | |
| 5,526,449 A * | 6/1996 | Meade et al. | 385/14 |
| 6,520,777 B2 | 2/2003 | Cho et al. | |
| 6,752,931 B2 | 6/2004 | Dewa | |
| 6,917,729 B2 | 7/2005 | Zediker et al. | |
| 6,988,408 B2 | 1/2006 | Cho | |
| 7,027,475 B1 | 4/2006 | Zediker et al. | |
| 7,261,826 B2 | 8/2007 | Adams et al. | |
| 2001/0006233 A1 * | 7/2001 | Vallett | 257/48 |
| 2002/0017133 A1 | 2/2002 | Cho | |
| 2002/0126948 A1 | 9/2002 | Lim et al. | |
| 2003/0035607 A1 | 2/2003 | Brophy et al. | |
| 2003/0174930 A1 * | 9/2003 | Stawitcke et al. | 385/18 |
| 2004/0022482 A1 | 2/2004 | Blair et al. | |
| 2004/0151460 A1 * | 8/2004 | Kitcher et al. | 385/129 |
| 2004/0177689 A1 | 9/2004 | Cho | |
| 2005/0180701 A1 * | 8/2005 | Steinberg et al. | 385/92 |
| 2006/0104592 A1 * | 5/2006 | Jenkins et al. | 385/140 |
| 2007/0165980 A1 * | 7/2007 | Jenkins et al. | 385/14 |
| 2009/0175578 A1 * | 7/2009 | Strabley et al. | 385/39 |

FOREIGN PATENT DOCUMENTS

WO  9727500  7/1997

OTHER PUBLICATIONS

Agarwal et al., "Fabrication of Veritcal Mirrors Using Plasma Etch and KOH:IPA Polishing" "Journal of Micromechanics and Microengineering", Nov. 30, 2006, pp. 26-35, Publisher: Institute of Physics Publishing, Published in: UK.
European Patent Office, "European Search Report", Jul. 5, 2010, Published in: EP.

* cited by examiner

*Primary Examiner* — Dzung Tran
(74) *Attorney, Agent, or Firm* — Fogg & Powers LLC (57) ABSTRACT

An optical bench communicates light through free space in a plurality of trenches formed in the bench, each of the trenches formed by deep ion reactive etching and defined by two opposing side walls, such that the free space is between the opposing side walls. An exemplary embodiment has a first trench operable to receive the beam of light and operable to communicate the beam of light through the free space in the first trench; an angled reflection side wall operable to receive the beam of light routed through the first trench and operable to reflect at least a portion of the beam of light; and a second trench operable to receive the portion of the beam of light reflected from the angled reflection side wall and operable to route the portion of the beam of light through the free space in the second trench.

20 Claims, 6 Drawing Sheets

SYSTEM AND METHOD FOR FREE SPACE MICRO MACHINED OPTICAL BENCH

BACKGROUND OF THE INVENTION

Micro-Electro-Mechanical Systems (MEMS) optical systems employ an optical bench with various optical elements operable to control transmission of light through the system. Such optical elements may include lens, fully reflecting mirrors, partially reflecting mirrors, and/or wave guides. Some optical elements, such as the fully and partially reflecting mirrors, are manually placed on the optical bench or placed on the optical bench by a 'pick and place' machine. Such mirrors are then aligned and fixed into place.

The process of placing, aligning, and fixing one or more mirrors on an optical bench is a time consuming process that is relatively expensive. The difficulty and cost of placing, aligning, and fixing mirrors on the optical bench is further compounded as devices become smaller.

Wave guides may be used to precisely route light through an optical device. Since silicon is light transmissive, wave guides may be formed on the optical bench as part of the fabrication process. However, some applications require that the light be transmitted through free space. The free space may be filled with a gas, or the free space may be a vacuum. Accordingly, routing of transmitted light through free space requires fully and/or partially reflecting mirrors.

Accordingly, it is desirable to precisely control routing of light through free space in a MEMS optical bench. While fully and/or partially reflecting mirrors may accurately control the routing of light through a MEMS optical bench, the use of such mirrors suffers a serious disadvantage, namely that it is difficult and expensive to place, align, and fix such mirrors on the optical bench, particularly if by-hand alignment of the mirrors is required.

SUMMARY OF THE INVENTION

Systems and methods of constructing an optical bench operable to transmit light through free space within a trench formed in the optical bench are disclosed. An exemplary embodiment has a first trench operable to receive the beam of light and operable to communicate the beam of light through the free space in the first trench; an angled reflection side wall operable to receive the beam of light routed through the first trench and operable to reflect at least a portion of the beam of light; and a second trench operable to receive the portion of the beam of light reflected from the angled reflection side wall and operable to route the portion of the beam of light through the free space in the second trench.

In accordance with further aspects, an exemplary embodiment is fabricated by a process of forming an optical bench, and etching a trench in the crystalline substrate bench, the trench defined by opposing side walls in cooperation to form the free space, and further defined by an angled reflection side wall operable to receive light communicated through the free space of the trench. In some embodiments, the optical bench is a crystalline substrate bench.

BRIEF DESCRIPTION OF THE DRAWINGS

Preferred and alternative embodiments are described in detail below with reference to the following drawings.

DETAILED DESCRIPTION OF THE PREFERRED EMBODIMENT

Embodiments of an optical bench free space light beam router are operable to route (direct) a beam of light through the free space of a plurality of trenches with side walls etched into an optical bench. In some embodiments, the side walls are substantially vertical. Deep reactive ion etching (DRIE) is used to form the plurality of trenches and an angled reflection side wall.

Figure 1:
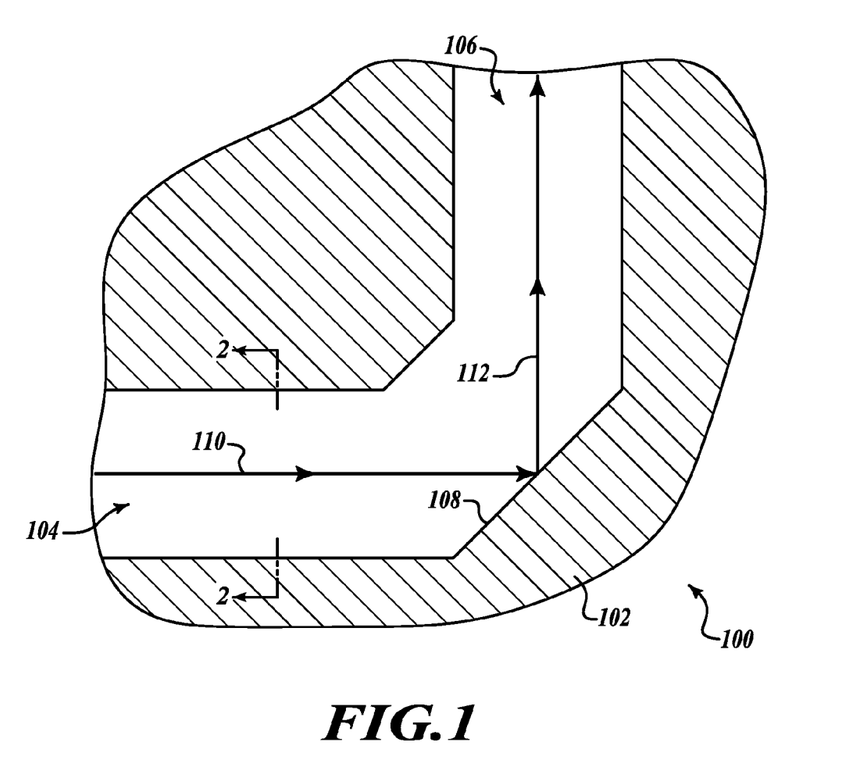
FIG. 1 is a top view of a portion of an optical bench operable as a light beam reflector with an exemplary embodiment of two trenches and an angled reflection side wall.

FIG. 1 is a top view of a portion of an optical bench 102 operable as a light beam reflector 100 with an exemplary embodiment of two trenches 104, 106 and an angled reflection side wall 108. A light beam is routed through the first trench 104 along path 110. When the light beam is incident on the angled reflection side wall 108, the light beam is reflected into the second trench 106 such that the light beam is routed along path 112.

In FIG. 1, the second trench 106 is illustrated as being perpendicular to the first trench 104. However, in the various embodiments, the angled reflection side wall 108 may be oriented in any suitable position to reflect the beam of light from the first trench 104 into the second trench 106. That is, the beam of light may be reflected at any desired angle, and accordingly, the trenches 104, 106 may be oriented at any desirable angle with respect to each other.

In some embodiments, the reflective surface of the angled reflection side wall 108 is polished with a focused ion beam to improve the reflectivity of the angled reflection side wall 108. To further improve and/or control reflectivity of the angled reflection side wall 108, a layer of metal or other suitable reflective material is added onto the surface of the angled reflection side wall 108.

Figure 2:
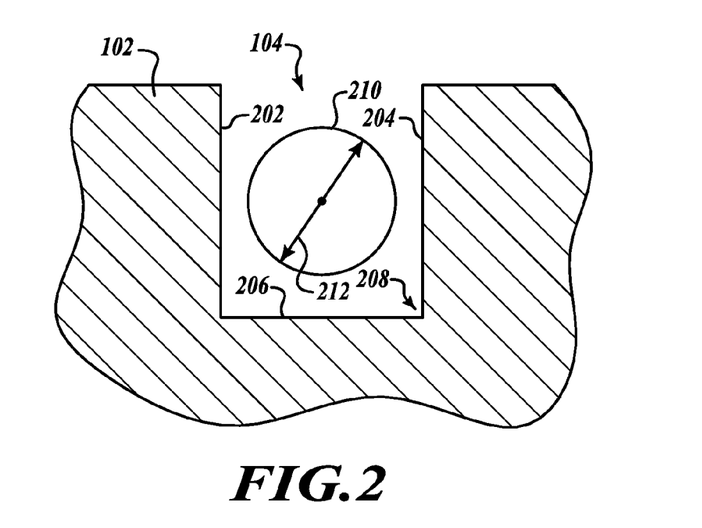
FIG. 2 is a cross-sectional view of an embodiment of the trench in the optical bench of FIG. 1.

FIG. 2 is a cross-sectional view of an embodiment of the trench 104 formed in the optical bench 102 of FIG. 1. The trench 104 is etched so that the side walls 202, 204 are substantially vertical. Further, the bottom 206 of the trench 104 may be substantially horizontal. Accordingly, a beam of light 210 routed through the trench 104 travels through the free space defined by the side walls 202, 204 and the bottom 206. Depending upon the type of and duration of etching, the bottom corners of the trench 104 may be substantially square or rounded. Other trenches are similarly configured.

FIG. 2 further illustrates a cross sectional view of the beam of light 210 communicated through the trench 104. Since the diameter 212 of the beam of light 210 is less than the width of the trench 104, the beam of light 210 is not substantially impeded by the side walls 202, 204 and/or the bottom 206 of trench 104.

The above-described optical bench 102 may be formed from any suitable material. Non-limiting examples of suitable material for the optical bench 102 include glass, plastic, crystalline substrate, or the like. In some embodiments, the material of the optical bench 102 is transparent (light transmissive) to the wavelength of the light beam routed through the trenches 104, 106 such as when portions of the material are used to split the beam of light, described in greater detail hereinbelow. In such embodiments where the optical bench 102 is made of a material that is light transmissive, a coating of reflective material may be used to reflect the beam of light from the angled reflection side wall 108.

Any suitable etching techniques may be used to form the trenches 104, 106 in the optical substrate 102. Further, the trenches 104, 106 are illustrated with substantially vertical sidewalls in FIG. 2. However, the trenches may have any suitable shape such that the beam of light 210 passes through free space within the trenches. In some embodiments, the side walls 202, 204, the bottom 206, and/or the angled reflection side wall 108 may be relatively smooth such that light scattering is reduced. For example, the angled reflection side wall 108 is preferably smooth to reduce light scattering as the beam of light 210 is reflected from the trench 104 into the trench 106. The walls may be further smoothed after initial formation using various supplemental processes, such as, but not limited to, irradiation with a focused ion beam.

Figure 3:
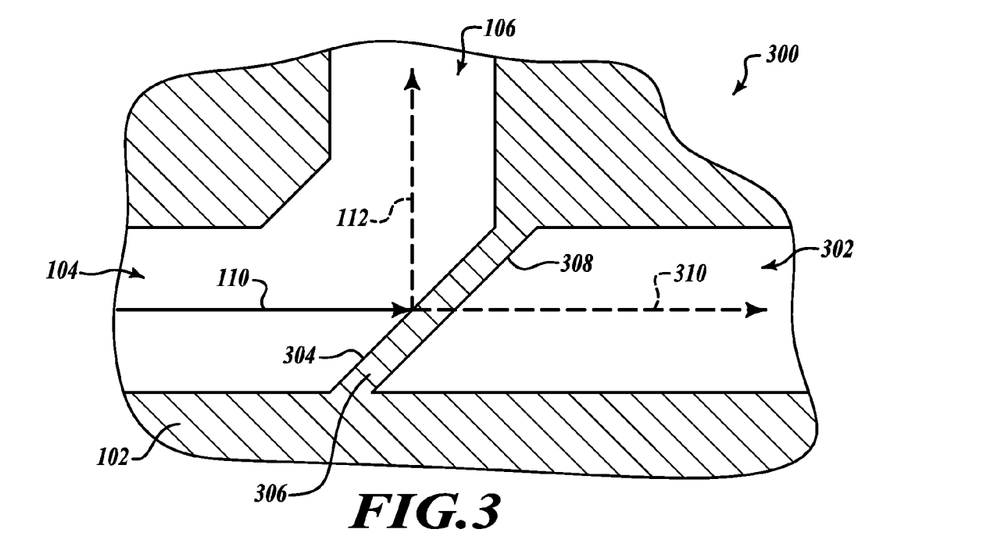
FIG. 3 is a top view of a portion of an optical bench operable as a light beam splitter with an exemplary embodiment of three trenches and a partially reflective side wall.

FIG. 3 is a top view of a portion of the optical bench 102 operable as a light beam splitter 300 with an exemplary embodiment of three trenches 104, 106, 302, and a partially reflective side wall 304. Here, the trench 302 may be configured similarly to, and may be substantially aligned with, the trench 104.

When the beam of light is incident on the angled partially reflective side wall 304, a first portion of the incident light beam is reflected into the second trench 106 such that the reflected portion of the light beam is routed along path 112. Since the side wall 304 is only partially reflective (less than 100% reflectivity), a second portion of the incident light beam is transmitted through the bench portion 306 of the optical bench 102. The communicated light exits the bench portion 306 from a surface of side wall 308 such that the second portion of the light beam is routed into the third trench 302 along the path 310. In some embodiments, the surface of side wall 308 may be oriented at the same angle as the partially reflective side wall 304. It is appreciated that there may be some degree of offset (not illustrated) in the light beam as it travels through the bench portion 306 and exits the surface of the side wall 308.

The optical bench 102 is light transmissive at the frequencies of the light beam travelling through the free space of the trenches. Accordingly, the partially reflective side wall 304 may be coated with a dielectric material or the like to control reflectivity and transmissivity of the side wall 304. Thus, selection of the type and/or amount of dielectric material or the like may be used to control the amount of light that is reflected from and transmitted through the partially reflective side wall 304.

Figure 4:
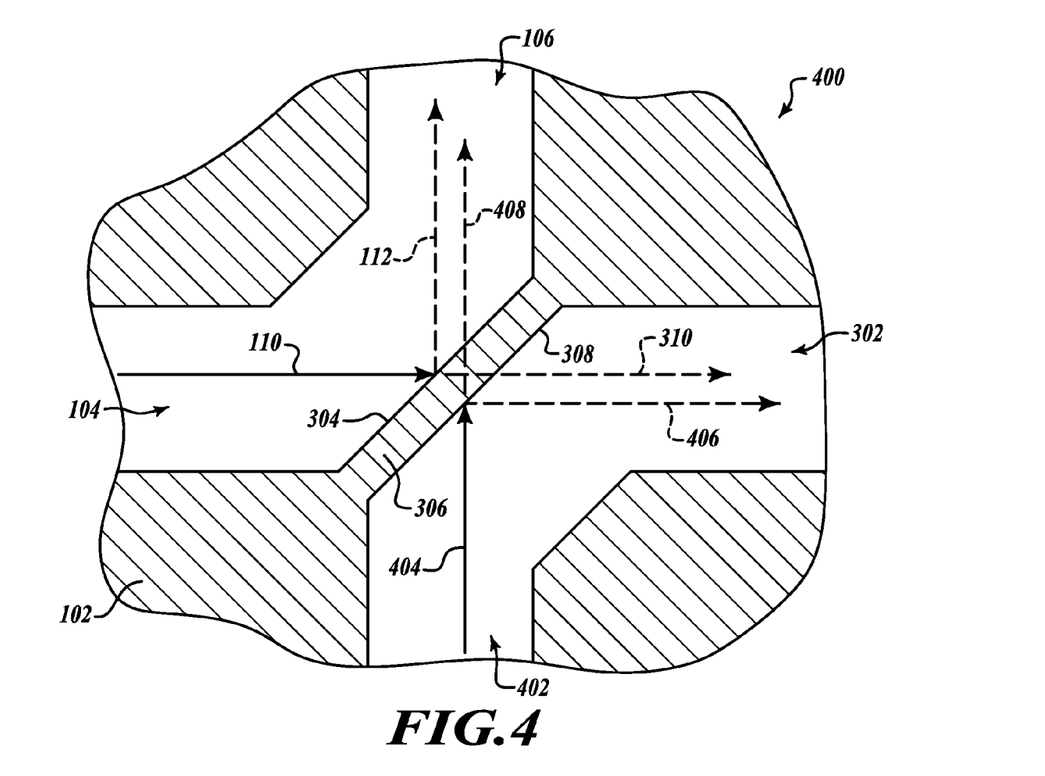
FIG. 4 is a top view of a portion of an optical bench operable as a light beam combiner with an exemplary embodiment of four trenches and a partially reflective side wall.

FIG. 4 is a top view of a portion of the optical bench 102 operable as a light beam combiner 400 with an exemplary embodiment of four trenches 104, 106, 302, 402, and two partially reflective side walls 304, 308. Here, the trench 402 may be configured similarly to, and may be substantially aligned with, trench 106. Etching is used to form the bench portion 306 of the optical bench 102 with the partially reflective side walls 304, 308 that are substantially parallel to each other. Alternatively, any suitable orientation of the side walls 304, 308 may be used. As noted above, a dielectric coating or the like is used to make the side walls 304, 308 partially reflective.

When a first beam of light, travelling along path 110, is incident on the angled partially reflective side wall 304, a first portion of the incident first light beam is reflected into the second trench 106 such that the reflected portion of the first light beam is routed along path 112. Since the side wall 304 is only partially reflective (less than 100% reflectivity), a second portion of the incident first light beam is transmitted through the portion 404 of the optical bench 102. The communicated light exits the bench portion 404 from the partially reflective side wall 308 such that the second portion of the first light beam is routed into the third trench 302 along path 310.

When a second beam of light, travelling along path 404, is incident on the angled partially reflective side wall 308, a first portion of the incident second light beam is reflected into the third trench 302 such that the reflected portion of the second light beam is routed along path 406. Accordingly, the second portion of the first beam of light and the first portion of the second beam of light are routed together down the third trench 302, and therefore, have been effectively combined.

Since the side wall 304 is only partially reflective (less than 100% reflectivity), a second portion of the incident second light beam is communicated into the bench portion 306 of the optical bench 102. The communicated light exits the bench portion 306 from the partially reflective side wall 304 such that the second portion of the second light beam is routed into the second trench 106 along path 408. Accordingly, the first portion of the first beam of light and the second portion of the second beam of light are routed together down the second trench 106, and therefore, have been effectively combined.

As noted above, the optical bench 102 is light transmissive at the frequencies of the light beam travelling through the free space of the trenches. Accordingly, the partially reflective side walls 304, 308 may be coated with a dielectric material or the like to control reflectivity and transmissivity of the side walls 304, 308. Thus, selection of the type and/or amount of dielectric material or the like may be used to control the amount of light that is reflected from and transmitted through the partially reflective side walls 304, 308. Different amounts of and/or types of dielectric material may be used on the partially reflective side walls 304, 308 to differently split the first beam of light and the second beam of light into their respective portions.

Figure 5:
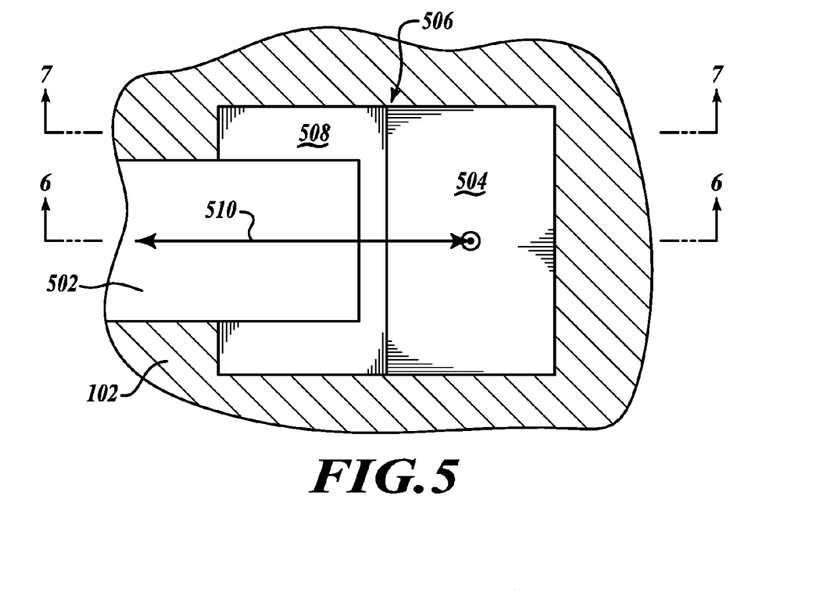
FIG. 5 is a top view of a portion of a crystalline substrate optical bench operable to reflect a light beam into or out of the crystalline substrate optical bench with an exemplary embodiment of a trench and V-groove side wall.
Figure 6:
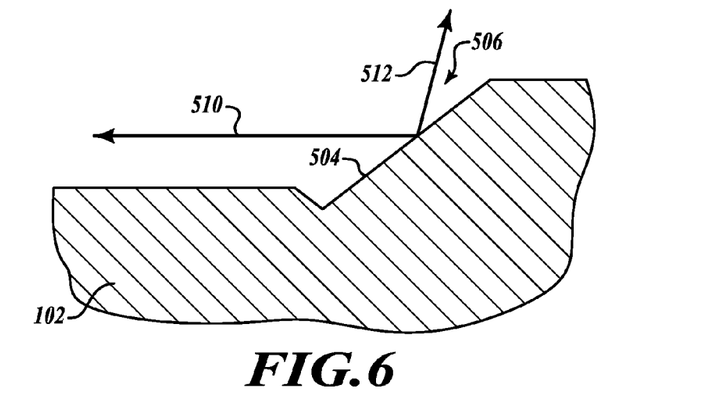
FIG. 6 is a cross-sectional view of the trench and the V-groove of FIG. 5.
Figure 7:
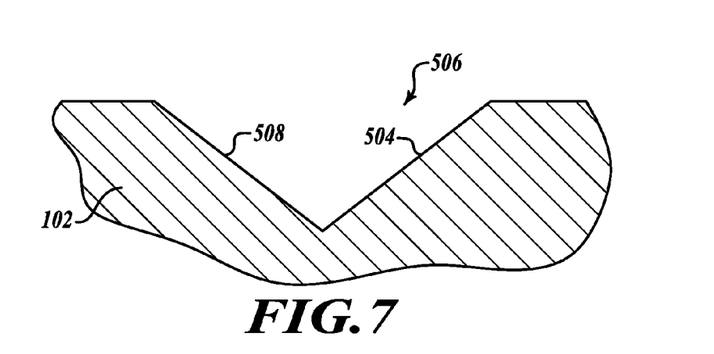
FIG. 7 is a cross-sectional view of the V-groove of FIG. 5.

FIG. 5 is a simplified conceptual top view of a portion of the optical bench 102 with a trench 502 and V-groove side wall 504 of a V-groove 506. V-groove side wall 504 is operable to reflect a light beam into or out of the optical bench 102. FIG. 6 is a simplified conceptual cross-sectional view along plane 6-6' of the free space trench 502 and the V-groove 506 of FIG. 5. FIG. 7 is simplified conceptual a cross-sectional view along plane 7-7' of the V-groove 506 of FIG. 5. In this embodiment, the optical bench 102 is preferably comprised of a crystalline substrate to facilitate etching of the V-groove 506.

A V-groove 506 with two side walls 504, 508 is etched into the optical bench 102 by anisotropic etching of the crystalline substrate optical bench 102 along selected planes of the crystal structure, such as crystal planes defined by, but not limited to, the (111) Miller indices. An etching mask uses a precise width along the mask pattern used to etch the V-groove 506. The V-groove 506 is substantially perpendicular to the length of the trench 502.

A beam of light travelling along the path 510 is incident on the V-groove side wall 504. The angle of the V-groove side wall 504 causes the incident light beam to be reflected out of the crystalline substrate optical bench 102 along path 512. Conversely, a beam of light travelling along path 512 towards the crystalline substrate optical bench 102 is incident on the V-groove side wall 504. The angle of the V-groove side wall 504 causes the incident light beam to be reflected out into the trench 502 of the crystalline substrate optical bench 102 along path 510. An exemplary angle of the V-groove side wall 504 along the (111) plane is approximately 54.7°.

In some embodiments, the reflective surface of the V-groove side wall 504 is sufficiently smooth to reflect the beam of light with acceptable levels of scattering. To further reduce light scattering and/or control reflectivity of the V-groove side wall 504, a layer of metal or other suitable reflective material may be added onto the surface of the V-groove side wall 504.

Figure 8:
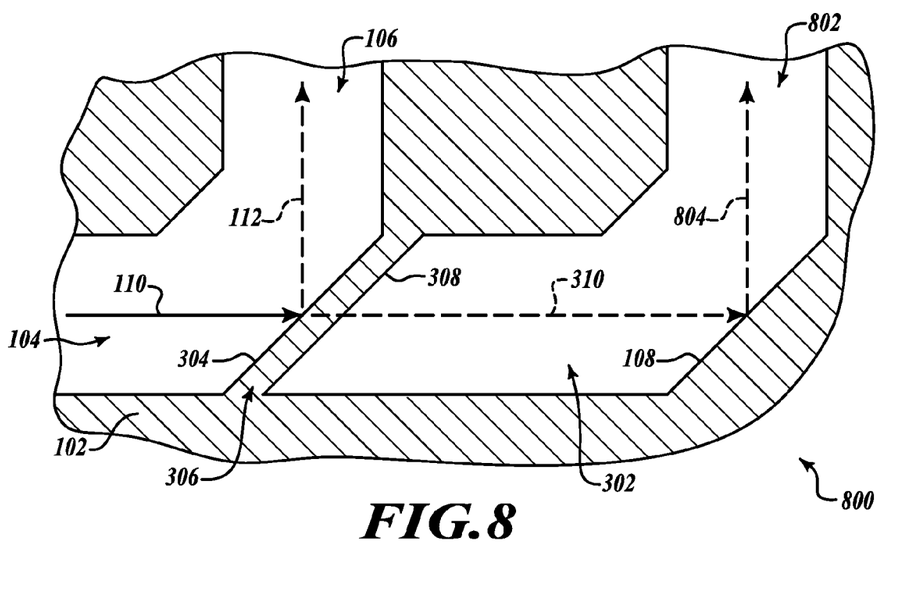
FIG. 8 is a top view of a portion of an optical bench operable as a parallel light beam generator with an exemplary embodiment of four trenches, a partially reflective side wall, and an angled reflection side wall.

FIG. 8 is a top view of a portion of the optical bench 102 operable as a parallel light beam generator 800. This exemplary embodiment has four trenches 104, 106, 302, 802, a partially reflective side wall 304, and an angled reflection side wall 108. As noted above with respect to FIG. 3, when the beam of light is incident on the angled partially reflective side wall 304, a first portion of the incident light beam is reflected into the second trench 106 such that the reflected portion of the light beam is routed along path 112. Since the side wall 304 is only partially reflective (less than 100% reflectivity), a second portion of the incident light beam is transmitted through the bench portion 306 of the optical bench 102. The transmitted light exits the bench portion 306 from the surface of side wall 308 such that the second portion of the light beam is routed into the third trench 302 along path 310.

When the second portion of the light beam is incident on the angled reflection side wall 108, the second portion of the light beam is reflected into the fourth trench 802 such that the light beam portion is routed along path 804. In this exemplary embodiment, the fourth trench 802 is substantially parallel to the second trench 106 such that the second portion of the split beam is travelling in a substantially parallel direction as the direction of travel of the first portion of the split beam. In other embodiments, the trenches 106 and 802 are not parallel, and accordingly, the directions of the first and second portions of the split beam are different.

Figure 9:
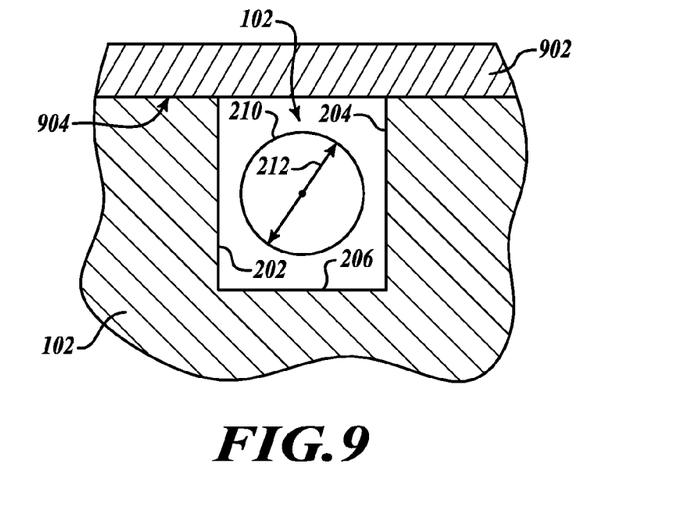
FIG. 9 is a cross-sectional view of an embodiment of the trench in the optical bench with a cover.

FIG. 9 is a cross-sectional view of an embodiment of the trench 104 in the optical bench 102 with a cover 902. The cover 902 may be sealed to the top side 904 of the optical bench 102. If the seal is air tight, the free space between the side walls 202, 204 and the bottom wall 206 may a vacuum or may be filled with a gas.

Figure 10:
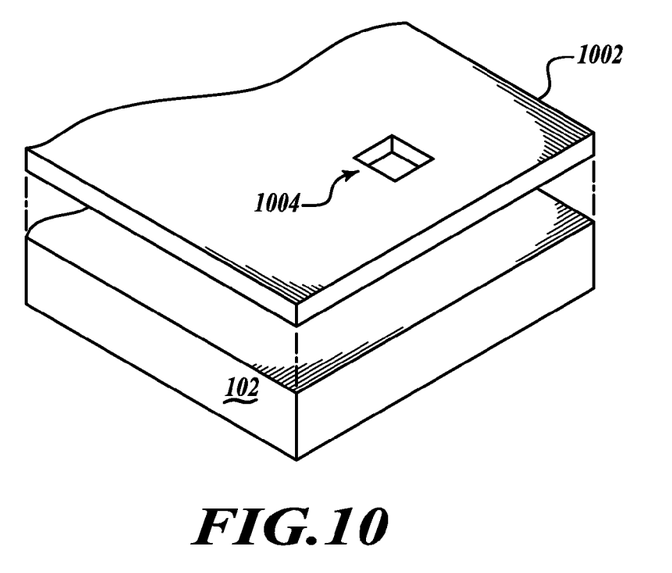
FIG. 10 is a perspective exploded view of a portion of a crystalline substrate optical bench and a mask layer pattern used to form a V-groove side wall.

FIG. 10 is a perspective exploded view of a portion of a crystalline substrate optical bench 102 wherein an exemplary embodiment of two trenches 104, 106 and an angled reflection side wall 108, and a first mask layer pattern 1002 is to be formed thereon. The mask layer pattern 1004 is initially used to etch the above-described V-groove 506 (FIG. 5) that is operable to reflect the light beam into or out of the optical bench 102. Preferably, the V-groove 506 is etched using a wet etch process. Accordingly, the mask layer pattern 1004 corresponds to the V-groove 506. It is appreciated that the mask layer pattern 1002 is formed on top of the optical bench 102 using any suitable process.

Figure 11:
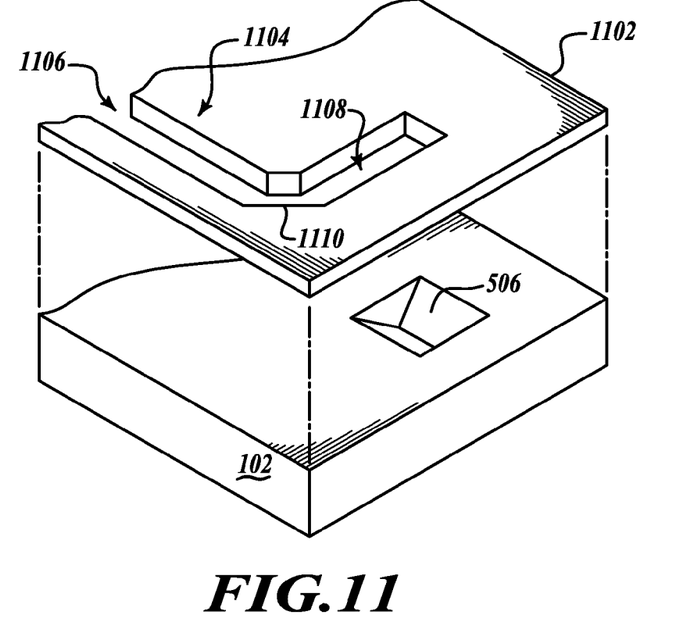
FIG. 11 is a perspective exploded view of a portion of a crystalline substrate optical bench with a previously formed V-groove and a mask layer pattern used to form two trenches and an angled reflection side wall.

FIG. 11 is a perspective exploded view of a portion of the crystalline substrate bench 102 and a mask layer pattern 1102. The mask layer pattern 1104 is used to etch the above-described exemplary embodiment of the two trenches 104, 106 and the angled reflection side wall 108 (FIG. 1) using a DRIE process. The mask layer pattern 1102 has a mask pattern 1104 thereon. The portion 1106 of the mask pattern 1104 forms the first trench 104. The portion 1108 of the mask pattern 1104 forms the second trench 106. The portion 1110 of the mask layer pattern 1104 forms the angled reflection side wall 108. It is appreciated that the mask layer pattern 1102 is formed on top of the optical bench 102 using any suitable process.

Figure 12:
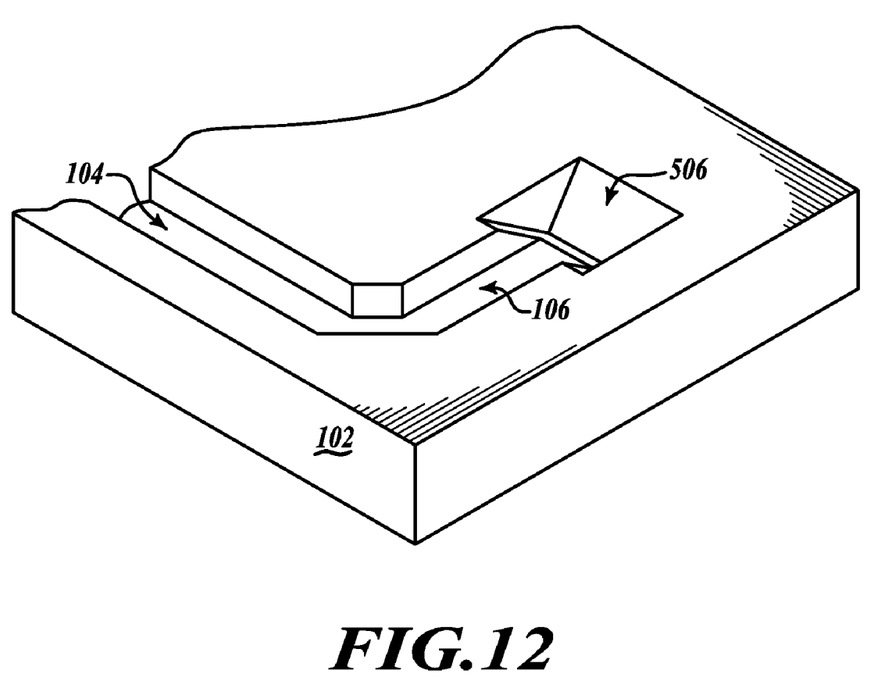
FIG. 12 is a perspective of the completed optical bench with the trenches, the angled reflection side wall, and the V-groove formed thereon.

FIG. 12 is a perspective of the completed optical bench 102 with the trenches 104, 106, the angled reflection side wall 108, and the V-groove 506 formed thereon. Accordingly, a beam of light can be routed through the free space of trenches 104 and 106, and enter/exit via the V-groove 506.

One skilled in the art appreciates that very complex and very precise mask patterns may be used for etching an optical bench to form very complex and precise paths for routing a beam of light through free space. The above described embodiments may be used alone or in combination to route the beam of light, and/or portion thereof, along any desired path depending upon the use of optical bench 102.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method for constructing optical benches operable to transmit light through free space within a trench formed in the optical bench, the method comprising:
    etching a trench in the optical bench, the trench defined by opposing side walls in cooperation to form the free space, wherein a width of the trench is configured to be greater than a diameter of a beam of light in the trench such that the beam of light is substantially unimpeded by the opposing side walls; and
    etching an angled reflection side wall operable to receive the light communicated through the free space of the trench.

2. The method of claim 1, wherein etching the optical bench comprises:
    deep reactive ion etching the trench, wherein the side walls and the angled reflection side wall are substantially vertical.

3. The method of claim 1, wherein etching the optical bench comprises:
    polishing the angled reflection side wall with a focused ion beam.

4. The method of claim 1, further comprising:
    coating the angled reflection side wall with a metal, wherein the angled reflection side wall is operable to reflect the transmitted light.

5. The method of claim 1, further comprising:
    coating the angled reflection side wall with a dielectric, wherein the angled reflection side wall is operable to reflect a first portion of the transmitted light and is operable to transmit a second portion of the transmitted light through the angled reflection side wall.

6. The method of claim 1, wherein the optical bench is a crystalline substrate, and wherein etching the crystalline substrate bench comprises:
anisotropically etching the crystalline substrate bench along a plane of a crystal of the crystalline substrate bench to form a V-groove at an end of the trench, wherein a side of the V-groove is the angled reflection side wall and is operable to reflect the transmitted light out of the trench and into the trench.

7. The method of claim 1, further comprising:
covering at least a portion of the trench with a cover.

8. A method for communicating a beam of light through an optical bench, the method comprising:
routing the beam of light through free space of a trench with opposing side walls in the optical bench, wherein a width of the trench is greater than a diameter of the beam of light such that the beam of light is substantially unimpeded by the opposing side walls; and
receiving the beam of light with an angled reflection side wall.

9. The method of claim 8, wherein the trench is formed by deep reactive ion etching.

10. The method of claim 8, wherein the trench is a first trench, further comprising:
reflecting the beam of light from the angled reflection side wall into the free space of a second trench with side walls etched in the optical bench.

11. The method of claim 8, wherein the trench is a first trench, and wherein the angled reflection side wall is coated with a dielectric such that the angled reflection side wall is partially reflective and partially transmissive in accordance with the dielectric, further comprising:
reflecting a first portion of the beam of light from the angled reflection side wall into the free space of a second trench with side walls etched in the optical bench; and
routing a second portion of the beam of light through the angled reflection side wall into the free space of a third trench with side walls etched in the optical bench, wherein the third trench is substantially aligned with the first trench.

12. The method of claim 11, wherein the angled reflection side wall is a first angled reflection side wall, further comprising:
receiving the second portion of the beam of light with a second angled reflection side wall; and
reflecting the second portion of the beam of light from the second angled reflection side wall into the free space of a fourth trench with side walls etched in the optical bench.

13. The method of claim 8, wherein the beam of light is a first beam of light,
wherein the trench is a first trench, wherein the angled reflection side wall is defined by a first external side wall and a second external side wall substantially parallel to the first external side wall,
wherein the first external side wall and the second external side wall are coated with a dielectric such that the angled reflection side wall is partially reflective and partially transmissive in accordance with the dielectric,
the method further comprising:
reflecting a first portion of the first beam of light from the first external side wall into the free space a second trench with side walls etched in the optical bench;
transmitting a second portion of the first beam of light through the angled reflection side wall into the free space of a third trench with side walls etched in the optical bench, wherein the third trench is substantially aligned with the first trench;
routing a second beam of light through the region of free space of a fourth trench with side walls etched in the optical bench, wherein the fourth trench is substantially aligned with the second trench;
receiving the second beam of light with the second external side wall;
reflecting a first portion of the second beam of light from the second external side wall into the third trench; and
transmitting a second portion of the second beam of light through the angled reflection side wall into the second trench.

14. An optical bench operable to communicate a beam of light through free space in a plurality of trenches in the bench, each of the trenches defined by two opposing side walls, such that the free space is between the opposing side walls, the optical bench comprising:
a first trench operable to receive the beam of light and operable to communicate the beam of light through the free space in the first trench, wherein a width of the plurality of trenches is configured to be greater than a diameter of the beam of light in the plurality of trenches such that the beam of light is substantially unimpeded by the opposing side walls;
an angled reflection side wall operable to receive the beam of light routed through the first trench and operable to reflect at least a portion of the beam of light; and
a second trench operable to receive the portion of the beam of light reflected from the angled reflection side wall and operable to route the portion of the beam of light through the free space in the second trench.

15. The optical bench of claim 14, further comprising:
a metal coating on the angled reflection side wall such that the angled reflection side wall reflects substantially all of the beam of light into the second trench.

16. The optical bench of claim 14, further comprising:
a third trench substantially aligned with the first trench, wherein the angled reflection side wall is between the third trench and the first trench;
a dielectric coating on the angled reflection side wall such that the angled reflection side wall reflects a first portion of the beam of light into the second trench and such that the angled reflection side wall transmitting a second portion of the beam of light into the third trench.

17. The optical bench of claim 16, wherein the angled reflection side wall is a first angled reflection side wall, and further comprising:
a second angled reflection side wall operable to receive the second portion of the beam of light from the third trench and operable to reflect at least a third portion of the beam of light; and
a fourth trench operable to receive the third portion of the beam of light reflected from the second angled reflection side wall and operable to route the third portion of the beam of light through the free space in the fourth trench.

18. The optical bench of claim 17, further comprising:
a metal coating on the second angled reflection side wall such that the second angled reflection side wall reflects substantially all of the second portion of the beam of light into the fourth trench.

19. The optical bench of claim 14, wherein the beam of light is a first beam of light, wherein the angled reflection side wall is defined by a first external side wall and a second external side wall substantially parallel to the first external side wall, and further comprising:
 a third trench substantially aligned with the first trench, wherein the angled reflection side wall is between the third trench and the first trench;
 a fourth trench substantially aligned with the second trench and operable to receive a second beam of light, wherein the angled reflection side wall is between the fourth trench and the second trench;
 a first dielectric coating on the first external side wall such that the first external side wall reflects a first portion of the first beam of light into the second trench and such that the first external side wall transmits a second portion of the first beam of light into the third trench; and
 a second dielectric coating on the second external side wall such that the second external side wall reflects a first portion of the second beam of light into the third trench and such that the second angled reflection side wall transmits a second portion of the second beam of light into the second trench.

20. The optical bench of claim 14, further comprising:
 a cover over the first trench and the second trench; and
 a seal operable to seal the free space in the first trench and the second trench.

\* \* \* \* \*